(12) United States Patent
Matsuda et al.

(10) Patent No.: US 11,634,535 B2
(45) Date of Patent: Apr. 25, 2023

(54) POLYMER COMPOUND AND METHOD OF SYNTHESIZING THE SAME

(71) Applicant: CANON KABUSHIKI KAISHA, Tokyo (JP)

(72) Inventors: Katsuhiro Matsuda, Kawasaki (JP); Hirohide Matsuhisa, Yokohama (JP); Hitoshi Horie, Kawasaki (JP); Takeshi Komuro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/792,415

(22) Filed: Jul. 6, 2015

(65) Prior Publication Data
US 2016/0002395 A1  Jan. 7, 2016

Related U.S. Application Data (60) Division of application No. 13/402,723, filed on Feb. 22, 2012, now abandoned, which is a continuation of application No. 12/092,805, filed as application No. PCT/JP2006/322510 on Nov. 6, 2006, now Pat. No. 8,143,355.

(30) Foreign Application Priority Data

Nov. 7, 2005 (JP) .............................. JP2005-322310
Oct. 31, 2006 (JP) .............................. JP2006-295938

(51) Int. Cl.
*C08G 63/16* (2006.01)

(52) U.S. Cl.
CPC ......... *C08G 63/16* (2013.01); *Y10T 428/1352* (2015.01)

(58) Field of Classification Search
CPC .......................... C08G 63/16; Y10T 428/1352
USPC ....................... 525/437; 528/272, 297, 308.3
See application file for complete search history.

(56) References Cited

U.S. PATENT DOCUMENTS

| | | | | |
|---|---|---|---|---|
| 5,283,295 | A | * | 2/1994 | Light ..................... C08L 67/02 525/466 |
| 5,391,696 | A | * | 2/1995 | Krone .................. A61K 9/1641 528/272 |
| 2008/0242789 | A1 | * | 10/2008 | Zhu ........................ C08L 69/00 524/502 |

OTHER PUBLICATIONS

Werpy, T., et al.; Top Value Added Chemical From Biomass, vol. 1: Results of Screening for Potential Candidates from Sugars and Synthesis Gas, Aug. 2004, p. i-69.*
Lewkowski, J.; Synthesis, Chemistry and Applications of 5-Hydroxymethyl-furfural and its Derivatives, 2001, p. 17-54.*
Culbertson, B.M., et al.; Advances in Polymer Synthesis, 1985, p. 51-91.*
Dangseeyun, N., et al.; Polymer Testing, 2004, vol. 23, p. 187-194.*
Kurian, J.V.; Journal of Polymers and the Environment, 2005, vol. 13, No. 2, p. 159-167.*
Henze, H.R., et al.; Journal of the American Chemical Society, 1933, vol. 55, No. 2, p. 680-686.*
Van Berkel et al.; Macromolecules, 2018, p. 8539-8549.*
Zamorsky et al.; Chemical Industry, 1959, p. 382-384.*
Manyasek; Chemical Fibers, 1963, No. 6, p. 35-38.*

* cited by examiner

*Primary Examiner* — Robert S Jones, Jr.
(74) *Attorney, Agent, or Firm* — Canon U.S.A., Inc., IP Division (57) ABSTRACT

Provided is a polymer compound having a furan ring having a degree of polymerization of 185 or more and 600 or less. This polymer compound has excellent mechanical strength (flexural strength).

22 Claims, 3 Drawing Sheets

POLYMER COMPOUND AND METHOD OF SYNTHESIZING THE SAME

CROSS REFERENCE TO RELATED APPLICATIONS

This application is a Divisional of U.S. patent application Ser. No. 13/402,723 filed on Feb. 22, 2012, which is a Continuation of U.S. patent application Ser. No. 12/092,805 filed May 6, 2008, which is a National Stage Entry of PCT Application No. PCT/2006/322510, filed Nov. 6, 2006, which claims priority to Japanese Patent Laid-Open No. 2006-295938, filed Oct. 31, 2006, and Japanese Patent Laid-Open No. 2005-322310, filed Nov. 7, 2005, all of which are hereby incorporated by reference herein in their entireties.

TECHNICAL FIELD

The present invention relates to a novel polymer compound, and to a method of synthesizing the same.

BACKGROUND ART

Recently, a technology utilizing renewable resources (biomass) has attracted attention from a viewpoint of suppression in global warming and in use of depleting resources. As a plastic, polylactic acid has attracted attention as a plastic produced by using a plant as a raw material (hereinafter, referred to as a plant-derived plastic). Lactic acid to be used as a raw material is obtained by fermenting starch of corn, sweet potato, or the like. However, polylactic acid often has degraded mechanical strength and heat resistance compared to those of a conventional plastic, and use of polylactic acid has been limited to a packaging material, tableware, and the like.

An object of the invention described in Japanese Patent Application Laid-Open No. H11-140292 is to provide a polylactic acid-based resin composition having maintained characteristics of polylactic acid such as excellent biodegradability, mechanical strength, heat stability, and transparency, and improved brittleness of polylactic acid, and a method of producing the same. Another object of the invention described in Japanese Patent Application Laid-Open No. 11-140292 is to provide a packaging material or various molded products each formed of the polylactic acid-based resin composition.

Further, U.S. Pat. No. 2,251,731 and Y. Hachihama, T. Shono, and K. Hyono, Technol. Repts. Osaka Univ., 8, 475 (1958) each substantially describe the following skeleton structure.

Of the documents, Y. Hachihama, T. Shono, and K. Hyono, Technol. Repts. Osaka Univ., 8, 475 (1958) describes studies in effects of the number of methylene chains of α,ω-glycol on a melting point of a produced polymer compound in polycondensation of 2,5-furandicarboxylic acid and α,ω-glycol by conducting polycondensation with a varying number of methylene chains of α,ω-glycol.

U.S. Pat. No. 2,251,731 describes experimental conditions for synthesis of a polyester having a heterocyclic ring in a skeleton of a polymer compound, and an yield of the polymer compound.

U.S. Pat. No. 2,251,731 and Y. Hachihama, T. Shono, and K. Hyono, Technol. Repts. Osaka Univ., 8, 475 (1958) each describe the skeleton structure described above, but include no description of the number of units.

Such a skeleton structure is described, but physical properties described in Y. Hachihama, T. Shono, and K. Hyono, Technol. Repts. Osaka Univ., 8, 475 (1958) (see FIG. 1 of p. 479, for example), for example, refer to a melting point alone. Mechanical strength is not revealed, and whether the skeleton structure can be used for applications of electric and electronic components and the like is not clarified.

DISCLOSURE OF THE INVENTION

Therefore, the inventors of the present invention have synthesized a polymer compound having the skeleton structure described above by defining a degree of polymerization (DPn, in polymethyl methacrylate equivalent) and have studied mechanical strength. As a result, the inventors of the present invention have found that the polymer compound can be used for applications of electric and electronic components and the like, and have completed the present invention.

Thus, according to one aspect of the present invention, there is provided a polymer compound characterized by having a unit represented by the following formula (2):

in the formula (2), A represents an aromatic hydrocarbon group which may be substituted, an aliphatic hydrocarbon group which may be substituted, or an alicyclic hydrocarbon group which may be substituted, and n represents a degree of polymerization of 185 or more and 600 or less.

According to another aspect of the present invention, there is provided a composition for a molded product including the above-mentioned polymer compound and an additive.

Further, according to another aspect of the present invention, there is provided a method of synthesizing a polymer compound, characterized by synthesizing a polymer compound represented by the following formula (2):

including reacting:

a furandicarboxylic acid compound represented by the following formula (1):

in the formula (1), X represents a hydroxyl group, an alkoxy group, or a halogen group; and a polyhydric alcohol represented by the following formula (3):

in the formula (3), B represents an aromatic hydrocarbon group which may be substituted, an aliphatic hydrocarbon group which may be substituted, or an alicyclic hydrocarbon group which may be substituted, and m is 2 or more.

The polymer compound of the present invention has numerical limitation for the degree of polymerization (the number of repeating units), and is a polymer compound having excellent moldability and mechanical strength (flexural strength).

Further, such a polymer compound can be provided as a thermoplastic resin containing an additive.

BEST MODE FOR CARRYING OUT THE INVENTION

According to one aspect of the present invention, a polymer compound is characterized by having a unit represented by the following formula (2):

in the formula (2), A represents an aromatic hydrocarbon group which may be substituted, an aliphatic hydrocarbon group which may be substituted, or an alicyclic hydrocarbon group which may be substituted, and n represents a degree of polymerization (DPn, in polymethyl methacrylate equivalent) of 185 or more and 600 or less.

In the case where n is less than 185, the polymer compound has low flexural strength and is hardly used for applications of electric and electronic components.

In the case where n is more than 600, the polymer compound has excessively high viscosity and poor moldability.

In the case where n is 185 or more and 600 or less, the polymer compound has a flexural strength of more than 34 MPa, which is a flexural strength of high impact polystyrene (PS Japan Corporation, grade name, 433) as a general-purpose plastic, and thus has favorable mechanical strength.

The polymer compound according to the present invention may have one kind of unit represented by the formula (2), or may be a copolymer having two or more kinds of units having different Rs. The former compound may be referred to as a homopolymer, and the latter compound may be referred to as a copolymer. Alternatively, the polymer compound according to the present invention may be a copolymer with a different monomer unit.

In the case where the polymer compound of the present invention is obtained from a plant-derived raw material, the polymer compound according to the present invention is often a homopolymer.

Examples of the aromatic hydrocarbon group represented by A in the formula (2) include condensed rings such as a naphthalene ring, an indene ring, an anthracene ring, and a phenanthrene ring, in addition to a benzene ring, a biphenyl ring, and a bis(phenyl)alkane. Examples of the bis(phenyl) alkane include bis(2-hydroxyphenyl)methane and 2,2'-bis (hydroxyphenyl)propane. On the other hand, examples of the heterocyclic ring include: a five-membered ring such as furan, thiophene, pyrrole, oxazole, thiazole, or imidaozle; a six-membered ring such as pyran, pyridine, pyridazine, pyrimidine, or pyrazine; and a condensed ring such as indole, carbazole, coumarin, quinoline, isoquinoline, acridine, benzothiazole, quinolixane, or purine.

Examples of the aliphatic hydrocarbon group represented by A in the formula (2) include an ethylene group, a propylene group, an isopropylene group, an n-butylene group, an isobutylene group, an s-butylene group, a t-butylene group, a pentylene group, an isopentylene group, and a neopentylene group. Preferred examples of the aliphatic hydrocarbon group include linear or branched alkylene groups each having 2 to 4 carbon atoms such as an ethylene group, a propylene group, and a butylene group.

Examples of the alicyclic hydrocarbon group represented by A in the formula (2) include divalent groups each obtained from a cycloalkylene group or a cycloalkenyl group. Examples of the cycloalkylene group include a cyclopentylene group, a cyclohexylene group, a cycloheptylene group, a cyclooctylene group, a cyclononylene group, and a cyclodecylene group. Examples of the cycloalkenyl group include a cyclobutenyl group, a cyclopentenyl group, a cyclohexenyl group, a cycloheptenyl group, and a cyclooctenyl group.

Each of those aromatic hydrocarbon groups, aliphatic hydrocarbon groups, and alicyclic hydrocarbon groups may be substituted. Example of the substituents include those each containing a hetero atom such as an oxygen atom, a nitrogen atom, a silicon atom, or a halogen atom. Specific examples of the substituents include an aliphatic oxy group, an aromatic oxy group, a siloxy group, an amino group, a nitro group, a cyano group, a silyl group, and a halogeno group. Specific examples of the aliphatic group of the aliphatic oxy group include a methyl group, an ethyl group, a propyl group, a butyl group, a hexyl group, an octyl group, a cyclohexylmethyl group, a trimethylsiloxyhexyl group, a chloroethyl group, a methoxybutyl group, a dimethylaminomethyl group, a butenyl group, and an octenyl group. An example of the aromatic oxy group is a phenoxy group.

Next, description will be given of synthesis of the polymer compound of the present invention.

The polymer compound having the unit represented by the formula (2) may be obtained by reacting: a furandicarboxylic acid compound represented by the formula (1) (including furandicarboxylic acid and a derivative in which X represents an alkoxy group or a halogen atom); and a polyhydric alcohol represented by the formula (3). At least one kind of furandicarboxylic acid, a furandicarboxylic acid compound, and a polyhydric alcohol all serving as raw materials for a polymer compound may be produced from biomass.

(1)

In the formula (1), X represents a hydroxyl group, an alkoxy group, or a halogen atom.

Examples of furandicarboxylic acid include: 2,5-furandicarboxylic acid; 2,4-furandicarboxylic acid; and 3,4-furandicarboxylic acid. Preferred examples of the alkoxy group in the formula (1) include a methoxy group and an ethoxy group. The furandicarboxylic acid compound represented by the formula (1) can be produced from the so-called plant-derived raw material (biomass) such as cellulose, glucose, or fructose by a known method.

(3)

In the formula (3), B represents an aromatic hydrocarbon group which may be substituted, an aliphatic hydrocarbon group which may be substituted, or an alicyclic hydrocarbon group which may be substituted, and m is 2 or more.

A reaction path is described by the following general formula.

That is, the polymer compound according to the present invention may be referred to as a condensate based on the reaction path.

Examples of the aromatic hydrocarbon group represented by B in the formula (3) include various aromatic rings represented by R in the formula (2) such as a benzene ring and a biphenyl ring. The aromatic ring may have various substituents. Examples of the substituent include: a hydrocarbon group such as an alkyl group or an alkenyl group; and various substituents described for A in the formula (2).

Examples of the aliphatic hydrocarbon group represented by B in the formula (3) include: a hydrocarbon group such as an alkylene group; and various substituents described for the aliphatic hydrocarbon group represented by A in the formula (2). Preferred examples of the aliphatic hydrocarbon group include linear or branched alkylene groups each having 2 to 4 carbon atoms such as an ethylene group, a propylene group, and a butylene group.

Examples of the alicyclic group represented by B in the formula (3) include: a cycloalkylene group; a cycloalkenyl group; and the alicyclic hydrocarbon groups described for A in the formula (2). Each of those aromatic hydrocarbon groups, aliphatic hydrocarbon groups, and alicyclic hydrocarbon groups may be substituted. Examples of the substituent include various substituents described for A in the formula (2).

$m$ in the formula (3) is preferably 2.

Specific examples of the formula (3) include an aliphatic or alicyclic diol, a dihydroxybenzene, a bisphenol, glycerin, trimethylolpropane, pentaerythritol, sorbitol, and saccharides. Further, there can be exemplified an etherdiol which is obtained through intermolecular dehydration of diols, and an oxycarboxylic acid such as hydroxybenzoic acid.

Specific examples of the aliphatic or alicyclic diol include ethylene glycol, 1,3-propanediol, 1,4-butanediol, and 1,4-cyclohexanedimethanol. Examples of the dihydroxybenzene include 1,3-dihydroxybenzene and 1,4-dihydroxybenzene.

Examples of the bisphenol include bis(2-hydroxyphenyl) methane, 2,2'-bis(hydroxyphenyl)propane, and 2,2'-bis(4-hydroxyphenyl)-sulfone.

In a preferred embodiment, a diol is used as a polyhydric alcohol. The diol represents 1,3-propanediol or 1,4-butanediol and is produced from a plant-derived raw material.

Examples of a polymerization method for obtaining the polymer compound according to the present invention include generally known methods such as solution polymerization, bulk polymerization, suspension polymerization, and emulsion polymerization. The polymerization method is arbitrarily selected in accordance with the kind of molded product. A polymerization temperature, a polymerization catalyst, a medium such as a solvent, and the like may be used in accordance with the polymerization method.

Next, description will be given of a reaction temperature for synthesis of the polymer compound according to the present invention.

As described above, the method of synthesizing the polymer compound according to the present invention is as follows. That is, the synthesis method includes the steps of: conducting esterification of a furandicarboxylic acid compound and a polyhydric alcohol in the presence of a catalyst to obtain an ester compound; and conducting polycondensation of the thus-obtained ester compound. A reaction temperature for conducting esterification is 110° C. to 200° C., and more preferably 150° C. to 180° C. A temperature range for conducting polycondensation is 180° C. to 280° C., and more preferably 180° C. to 230° C.

A polymer compound in a molten state formed at an endpoint of this polycondensation process may be used as it is or molded into a required shape to be used for a thermoplastic resin for a molded product. A composition containing the obtained polymer compound and various additives added as required may be used as a raw material for a molded product.

Next, detailed description will be given of the best mode for carrying out the present invention. In this mode, the method of producing the polymer compound of the present invention includes two steps. The first step involves esterification of a dicarboxylic acid and a diol, and the second step involves polycondensation through an ester exchange reaction.

In the first step, esterification of furandicarboxylic acid and a diol is conducted by gradually heating furandicarboxylic acid, diols, and a catalyst or a catalyst mixture to 110° C. to 200° C., and more preferably 150° C. to 180° C. under stirring. An endpoint of the esterification can easily be confirmed at the time when the reaction mixture becomes transparent. At this time, the reaction mixture is an oligomer, and is not a polymer. In the second step, a reaction system is heated to a temperature of 180° C. to 280° C., and more preferably 180° C. to 230° C., to thereby cause an ester exchange reaction and start polycondensation for molecular weight increase.

The polycondensation step described above is preferably conducted under vacuum. In a polycondensation reaction, a diol forms as a by-product, and the diol is removed to increase a reaction rate of polycondensation. The heating, stirring, and reducing pressure are continued until a polymer compound has a sufficient molecular weight allowing molding the molded product, or a sufficient molecular weight satisfying specifications of the molded product.

Next, detailed description will be given of an amount of a monomer to be introduced at a start of a reaction. The amount of a diol to be introduced at the start of the reaction is desirably 1 time to 3 times moles of furandicarboxylic acid. The diol in an excessive amount or a diol formed as the polycondensation reaction proceeds may be removed out of the reaction system by: distilling off the diol by bringing the reaction system to reduced pressure; distilling off the diol by boiling with another solvent; or removing the diol by other methods.

Next, description will be given of a catalyst. Synthesis of the polymer compound from a dicarboxylic acid and a diol proceeds without addition of a catalyst because of an autocatalysis action of the dicarboxylic acid. However, a concentration of the dicarboxylic acid reduces with the progress of polymerization, and thus the catalyst is more preferably added. The synthesis of the polymer compound of the present invention includes two steps of esterification and polycondensation through an ester exchange reaction, and thus preferred catalysts are present for respective steps.

Examples of a catalyst preferred for esterification in the first step include: a metal oxide or salt; an organometallic compound of tin, lead, titanium, or the like; and a tetravalent hafnium compound such as hafnium (IV) chloride or hafnium (IV) chloride(THF)$_2$. Examples of a catalyst most preferred for polycondensation through ester exchange in the second step include: an acetate or carbonate of lead, zinc, manganese, calcium, cobalt, magnesium, or the like; a metal oxide of magnesium, zinc, lead, antimony, or the like; and an organometallic compound of tin, lead, titanium, or the like. A particularly preferred example of a catalyst effective in both steps is titanium alkoxide.

The catalysts may be added separately in the first step and the second step, or may be mixed in an arbitrary combination from the above-mentioned catalyst group with a furandicarboxylic acid and a diol from the start of the reaction. The catalysts may obviously be added while a furandicarboxylic acid and a diol are heated, or the catalysts may be added once or more in an arbitrary combination form the above-mentioned catalyst group.

Further, solid-state polymerization may be conducted by a known method after the polymer compound is obtained.

As a specific preferred example, the thus-obtained polymer has a degree of polymerization (DPn, in polymethyl methacrylate equivalent) of 285, Tm of 170° C., and a 5% weight loss heat decomposition temperature of 338° C.

The polymer compound obtained by the above-mentioned method is a thermoplastic resin. The polymer compound has sufficient physical properties satisfying specifications of an optical device, a bottle, or a casing material. Alternatively, the polymer compound may be used as a thermoplastic resin for molding and molded into a desired shape, to thereby obtain a molded product according to the present invention. The molding method is not particularly limited. For example, compression molding, extrusion molding, or injection molding may be used. The polymer compound obtained by the above-mentioned method may contain a required amount of an additive such as a flame retardant, a colorant, an internal releasing agent, an antioxidant, a UV absorber, and various filers added.

Preferred application examples of the molded product include: an ink tank of an inkjet printer; a toner container for electrophotography; a packaging resin; and a structural material of a business machine such as a copier or a printer, or a casing of a camera.

EXAMPLES

In Examples 1 to 3, three polymer compounds and respective methods of synthesizing the polymer compounds according to the present invention will be described.

The following devices and conditions were used for measurement of a molecular weight of the polymer compound, measurement of a glass transition temperature (Tg), a crystallization temperature (Tc), and a melting point (Tm) of the polymer compound, and NMR measurement for confirming a structure of the polymer.

(Molecular Weight Measurement)
Analytical instrument: Alliance 2695, manufactured by Waters Corporation
Detector: differential refractometer
Eluant: hexafluoroisopropanol solution containing 5 mM sodium trifluoroacetate
Flow rate: 1.0 ml/min
Column temperature: 40° C.
Degree of polymerization: A number average molecular weight was determined by using a PMMA standard, and a degree of polymerization was calculated.
(Tg, Tc, and Tm measurements)
Device: Differential scanning calorimeter, manufactured by TA Instruments
Pan: platinum pan
Sample weight: 3 mg
Temperature increase start temperature: 30° C.
Temperature increase rate: 10° C./min
Atmosphere: nitrogen
(NMR measurement)
Device: JNM-ECA-400, manufactured by JEOL Ltd.

Example 1

Synthesis of polybutylene-2,5-furandicarboxylate

A 1-L four-necked flask equipped with a nitrogen introducing tube, a fractionating tube-condenser, a thermometer, and a SUS stirring blade was prepared. Into the four-necked flask, 2,5-furandicarboxylic acid (149.9 g), distilled 1,4-butanediol (259.5 g; molar ratio=1:3), a tin catalyst (0.059 wt %), and a titanium catalyst (0.059 wt %) dissolved in toluene were measured.

In the four-necked flask, stirring was started while nitrogen was introduced, and the flask was immersed in an oil bath at 150° C. to heat a content of the flask. At about an inner temperature of 150° C., effusion of by-product water started with a condensation reaction, and the content was heated to 170° C. over about 4 hours.

The fractionating tube was changed to a T-tube, and pressure reduction was started. Inside of the flask was adjusted to full vacuum (5 Pa) over about 1 hour, and the reaction was continued at 180° C. for about 390 min under reduced pressure (5 Pa). The obtained polymer was dissolved in hexafluoroisopropanol, and reprecipitated with methanol. The resultant was dried at 60° C. under vacuum day and night. Then, solid-state polymerization was conducted at a reaction temperature of 150° C. for increasing the molecular weight. The thus-obtained polymer had a degree of polymerization (DPn, in polymethyl methacrylate equivalent) of 285, Tm of 170° C., Tg of 31° C., Tc of 90° C., and a 5% weight loss heat decomposition temperature of 338° C.

Figure 1:
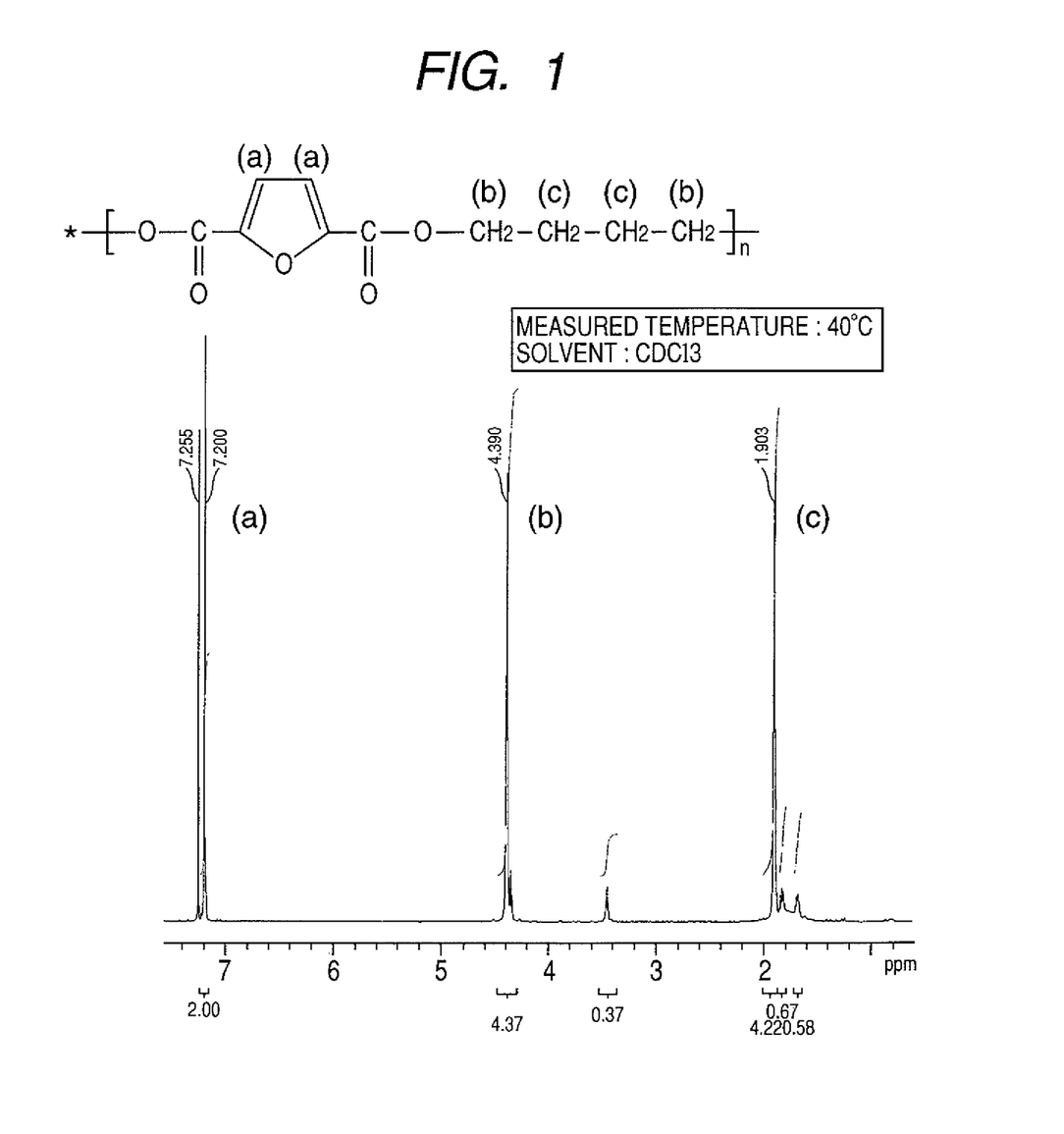
FIG. 1 shows polybutylene-2,5-furandicarboxylate and $^1$H-NMR spectrum thereof.

FIG. 1 shows results of identification of the polymer compound by $^1$H-NMR. Relative intensities of protons correspond to a theoretical value of (a):(b):(C)=1:2:2, indicating that the target polymer compound was obtained.

Example 2

Synthesis of polyethylene-2,5-furandicarboxylate

A 1-L four-necked flask equipped with a nitrogen introducing tube, a fractionating tube-condenser, a thermometer, and a SUS stirring blade was prepared. Into the four-necked flask, 2,5-furandicarboxylic acid (149.9 g), distilled ethylene glycol (186.2 g; molar ratio=1:3), a tin catalyst (0.05 wt %), and a titanium catalyst (0.05 wt %) dissolved in toluene were measured.

In the four-necked flask, stirring was started while nitrogen was introduced, and the flask was immersed in an oil bath at 150° C. to heat a content of the flask. At about an inner temperature of 150° C., effusion of by-product water started with a condensation reaction, and the content was heated to 280° C. over about 4 hours.

The fractionating tube was changed to a T-tube, and pressure reduction was started. Inside of the flask was adjusted to full vacuum (5 Pa) over about 1 hour, and the reaction was continued at 280° C. for about 390 min under reduced pressure (5 Pa). The obtained polymer was dissolved in hexafluoroisopropanol, and reprecipitated with methanol. The resultant was dried at 60° C. under vacuum day and night. Then, solid-state polymerization was conducted at a reaction temperature of 180° C. for increasing the molecular weight. The thus-obtained polymer had a degree of polymerization (DPn, in polymethyl methacrylate equivalent) of 126, Tm of 170° C., Tg of 85° C., a crystallization temperature of 156° C., and a heat decomposition temperature of 332° C.

Figure 2:
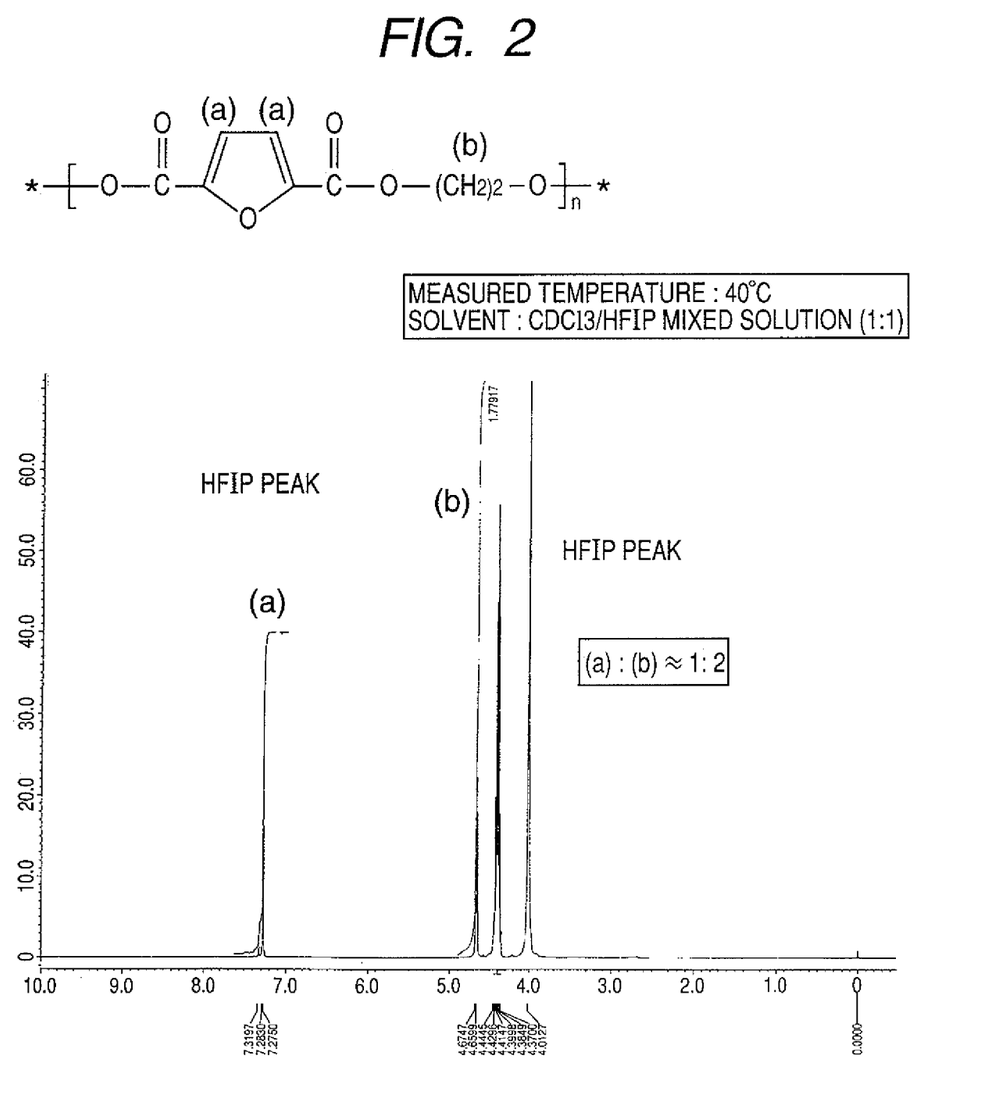
FIG. 2 shows polyethylene-2,5-furandicarboxylate and $^1$H-NMR spectrum thereof.

FIG. 2 shows results of identification of the polymer compound by $^1$H-NMR. Relative intensities of protons correspond to a theoretical value of (a):(b)=1:2, indicating that the target polymer compound was obtained.

Example 3

Synthesis of polytrimethylene-2,5-furandicarboxylate

A 1-L four-necked flask equipped with a nitrogen introducing tube, a fractionating tube-condenser, a thermometer, and a SUS stirring blade was prepared. Into the four-necked flask, 2,5-furandicarboxylic acid (149.9 g), distilled 1,3-propanediol (228.3 g; molar ratio=1:3), a tin catalyst (0.05 wt %), and a titanium catalyst (0.05 wt %) dissolved in toluene were measured.

In the four-necked flask, stirring was started while nitrogen was introduced, and the flask was immersed in an oil bath at 150° C. to heat a content of the flask. At about an inner temperature of 150° C., effusion of by-product water started with a condensation reaction, and the content was heated to 230° C. over about 4 hours.

The fractionating tube was changed to a T-tube, and pressure reduction was started. Inside of the flask was adjusted to full vacuum (5 Pa) over about 1 hour, and the reaction was continued at 230° C. for about 390 min under reduced pressure (5 Pa). The obtained polymer was dissolved in hexafluoroisopropanol, and reprecipitated with methanol. The resultant was dried at 60° C. under vacuum day and night. Then, solid-state polymerization was conducted at a reaction temperature of 140° C. for increasing the molecular weight. The obtained polymer had a degree of polymerization (DPn, in polymethyl methacrylate equivalent) of 78, Tm of 150° C., Tg of 39° C., a crystallization temperature of 102° C., and a heat decomposition temperature of 335° C.

Figure 3:
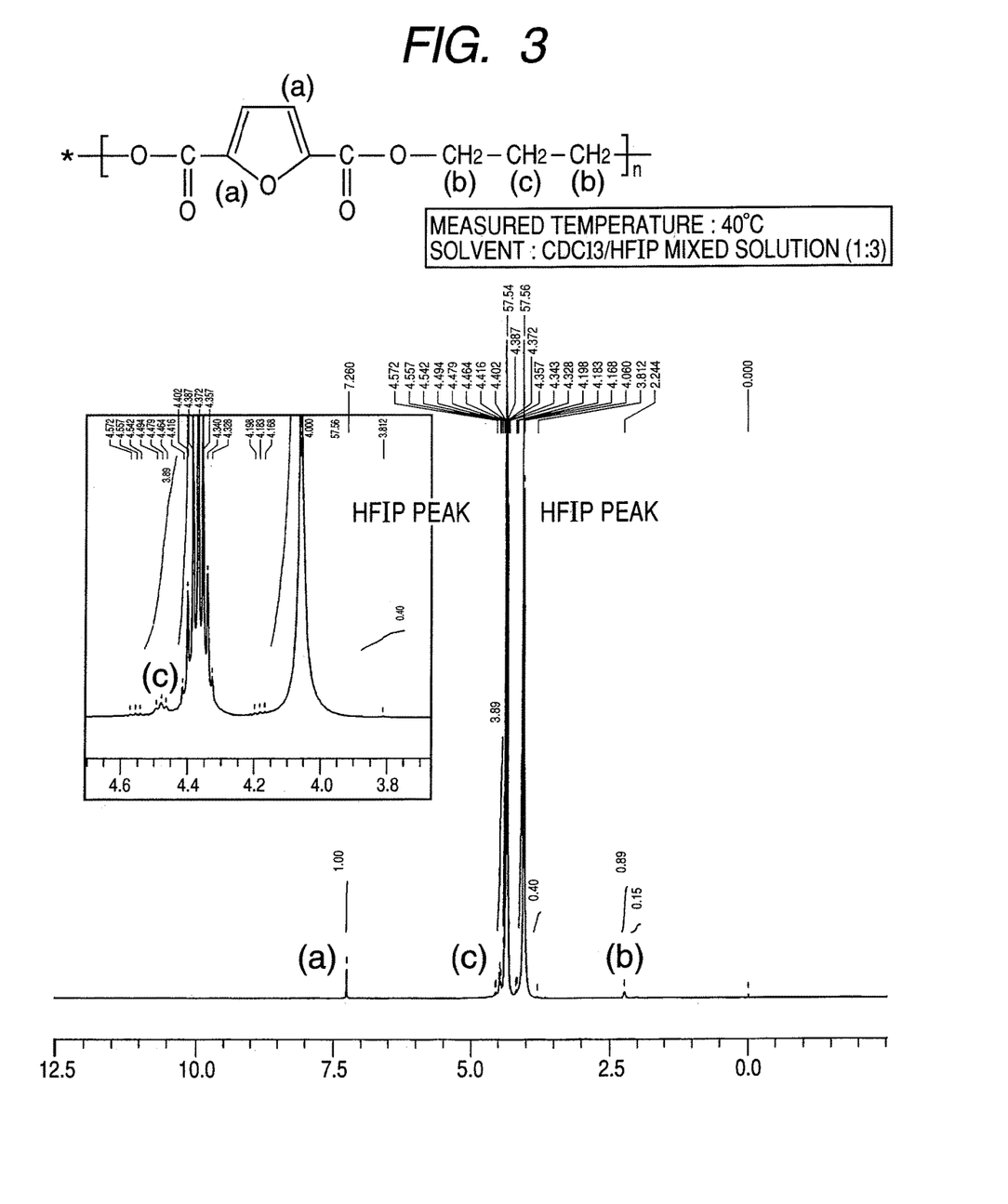
FIG. 3 shows polytrimethylene-2,5-furandicarboxylate and $^1$H-NMR spectrum thereof.

FIG. 3 shows results of identification of the polymer compound by $^1$H-NMR. Relative intensities of protons correspond to a theoretical value of (a):(b):(C)=1:2:1, indicating that the target polymer compound was obtained.

Example 4

Measurement of Heat Decomposition Temperature

Table 1 collectively shows heat decomposition temperatures of Examples. As a comparative example, polylactic acid (n=) available from Polymer Source, Inc. was purchased, and TGA measurement was conducted. As a result, the heat decomposition temperature of this polyester was 279° C.

The heat decomposition temperature was obtained through TGA measurement (thermogravimetry) of a sufficiently dried sample under the following conditions and was defined as a 5% weight loss.

Device: Thermogravimeter, manufactured by TA Instruments
Pan: platinum pan
Sample weight: 3 mg
Temperature increase start temperature: 30° C.
Temperature increase rate: 10° C./min
Atmosphere: nitrogen The results revealed that each of the polymer compounds had a higher heat decomposition temperature and excellent heat resistance than those of polylactic acid, which is a conventional plant-derived plastic.

TABLE 1

Comparison of heat decomposition temperature with polylactic acid

| Resin name | | Heat decomposition temperature/ ° C. |
|---|---|---|
| Example 1 | Polybutylene-2,5-furandicarboxylate | 338 |
| Example 2 | Polyethylene-2,5-furandicarboxylate | 332 |
| Example 3 | Polytrimethylene-2,5-furandicarboxylate | 335 |
| Comparative example | Polylactic acid | 279 |

Example 5

Mechanical strength of a molded product formed of the synthesized polymer compound is described. The polymer compound of Example 1 was dried under vacuum at 80° C. for 8 hours before molding. Then, press molding was conducted at 180° C., 170 Kg/cm², and a pressing time of 2 min. Table 2 shows physical properties of the molded product.

TABLE 2

Results of physical properties measurement of polybutylene-2,5-furandicarboxylate

| Test items | | Shape of test piece length × width × thickness (mm) | |
|---|---|---|---|
| Water absorption (%) | | 3 × 3 × 0.5 | 0.97 |
| Specific gravity | | 3 × 3 × 0.5 | 1.33 |
| Optical properties | All light transmittance (%) | In accordance with JIS K7105 | 85 |
| | Haze (%) | In accordance with JIS K7105 | 6.5 |

For measurement of flexural strength, flexural modulus, Charpy impact test (notched), and load-deflection temperature, the obtained polymer compound was subjected to injection molding to produce a rectangular test piece having a length of 80 mm, a width of 10 mm, and a thickness of 4 mm, and the measurement was conducted in accordance with ISO standards.

Respective measurement conditions are described below.

(Measurement conditions for flexural strength and flexural modulus)

Test method: ISO 178
Test temperature: 23° C.
Test speed: 2 mm/min (Measurement conditions for Charpy impact test (notched))

Test method: ISO 179/1eA (test piece No. 1 A-notch, striking direction of edgewise)
Hammer: 0.5 J (Measurement Conditions for Load-Deflection Temperature)

Test method: IS075-2
Load direction: flatwise
Flexural stress: 0.45 MPa, 1.80 MPa Table 3 shows the physical properties of the molded product.

TABLE 3

Results of physical properties measurement of polybutylene-2,5-furandicarboxylate

| | DPn = 105 | DPn = 185 | DPn = 285 | DPn = 380 |
|---|---|---|---|---|
| Flexural strength/Mpa | 26.3 | 51 | 98.3 | 109 |
| Flexural modulus/MPa | 2920 | 3200 | 3160 | 3110 |
| Charpy impact strength/ kJ/m² | 0.59 | 0.8 | 1.50 | 1.30 |
| Load-deflection temperature (notched) load of 0.45 MPa/ ° C. | 103 | 99 | 73 | 91 |
| Load-deflection temperature (notched) load of 1.80 MPa/ ° C. | 51 | 55 | 46 | 49 |

Table 3 reveals that the polymer compound of the present invention has favorable mechanical strength (flexural strength) and is a polymer compound that can be used for applications of electric and electronic components and the like.

In the case where the flexural strength is more than 34 MPa, which is a flexural strength of high impact polystyrene (PS Japan Corporation, grade name, 433) as a general-purpose plastic, the mechanical strength (flexural strength) of the sample is favorably evaluated. The results shown in Table 3 all indicate favorable results.

This application claims the benefit of Japanese Patent Applications No. 2005-322310, filed Nov. 7, 2005 and No. 2006-295938, filed Oct. 31, 2006, which are hereby incorporated by reference herein in their entirety.

The invention claimed is:

1. A liquid vessel comprising a molded article and an ink which is contained by the molded article, wherein the molded article comprises a polymer compound represented by the following formula (2):

wherein A represents an ethylene group and n represents 185 or more and 600 or less.

2. The liquid vessel according to claim 1, wherein the liquid vessel is an ink tank.

3. The liquid vessel according to claim 1, wherein the molded article further comprises at least one of a flame retardant, a colorant, an internal releasing agent, an antioxidant, a UV absorber and fillers.

4. The liquid vessel according to claim 1, the polymer compound further comprises a different monomer unit.

5. A business machine comprising a casing, the casing consisting essentially of a polymer compound represented by the following formula (2):

wherein A represents an ethylene group and n represents 185 or more and 600 or less.

6. The business machine according to claim 5, wherein the business machine is a copier.

7. The business machine according to claim 5, wherein the business machine is a printer.

8. The business machine according to claim 5, wherein the casing further comprises at least one of a flame retardant, a colorant, an internal releasing agent, an antioxidant, a UV absorber and fillers.

9. The business machine according to claim 5, the polymer compound further comprises a different monomer unit.

10. The liquid vessel according to claim 1, wherein the polymer compound has a flexural strength of 34 MPa or more.

11. The business machine according to claim 5, wherein the polymer compound has a flexural strength of 34 MPa or more.

12. The liquid vessel according to claim 1, wherein the n represents 185 or more and 380 or less.

13. The business machine according to claim 5, wherein the n represents 185 or more and 380 or less.

14. A composition consisting essentially of a polymer compound represented by the following formula (2):

wherein A represents an ethylene group and n represents 185 or more and 600 or less.

15. A structural material comprising the polymer compound according to claim 14.

16. A container comprising the polymer compound according to claim 14.

17. A casing comprising the polymer compound according to claim 14.

18. A method for producing a composition consisting essentially of a polymer compound represented by the following formula (2):

wherein A represents an ethylene group and n represents 185 or more and 600 or less the method comprising:
a step of reacting a furandicarboxylic acid compound represented by the following formula (1):

wherein X represents a hydroxyl group, an alkoxy group, or a halogen group, with a polyhydric alcohol;
a step of conducting polycondensation to the degree of polymerization.

19. The method for producing a molded article comprising:
the method for producing the polymer compound according to claim 18 and,
a step of molding the polymer compound.

20. The polymer compound according to claim 14, wherein the n represents 285 to 380.

21. The polymer compound according to claim 14 wherein the n represents 380.

22. A molded article consisting essentially of:
the composition according to claim 14; and
an additive,
wherein the additive is selected from the group consisting of a flame retardant, a colorant, an internal releasing agent, an antioxidant, a UV absorber, and fillers.

* * * * *